Figure 21:
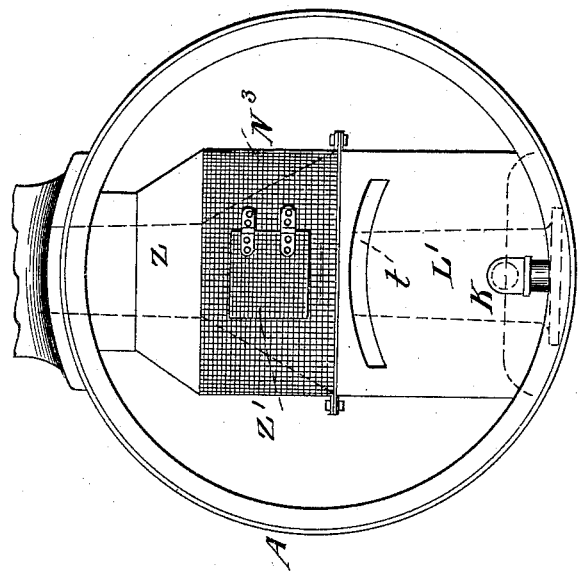

(No Model.) 6 Sheets—Sheet 1.
A. MITCHELL.
SPARK ARRESTER FOR LOCOMOTIVES.
No. 354,339. Patented Dec. 14, 1886.
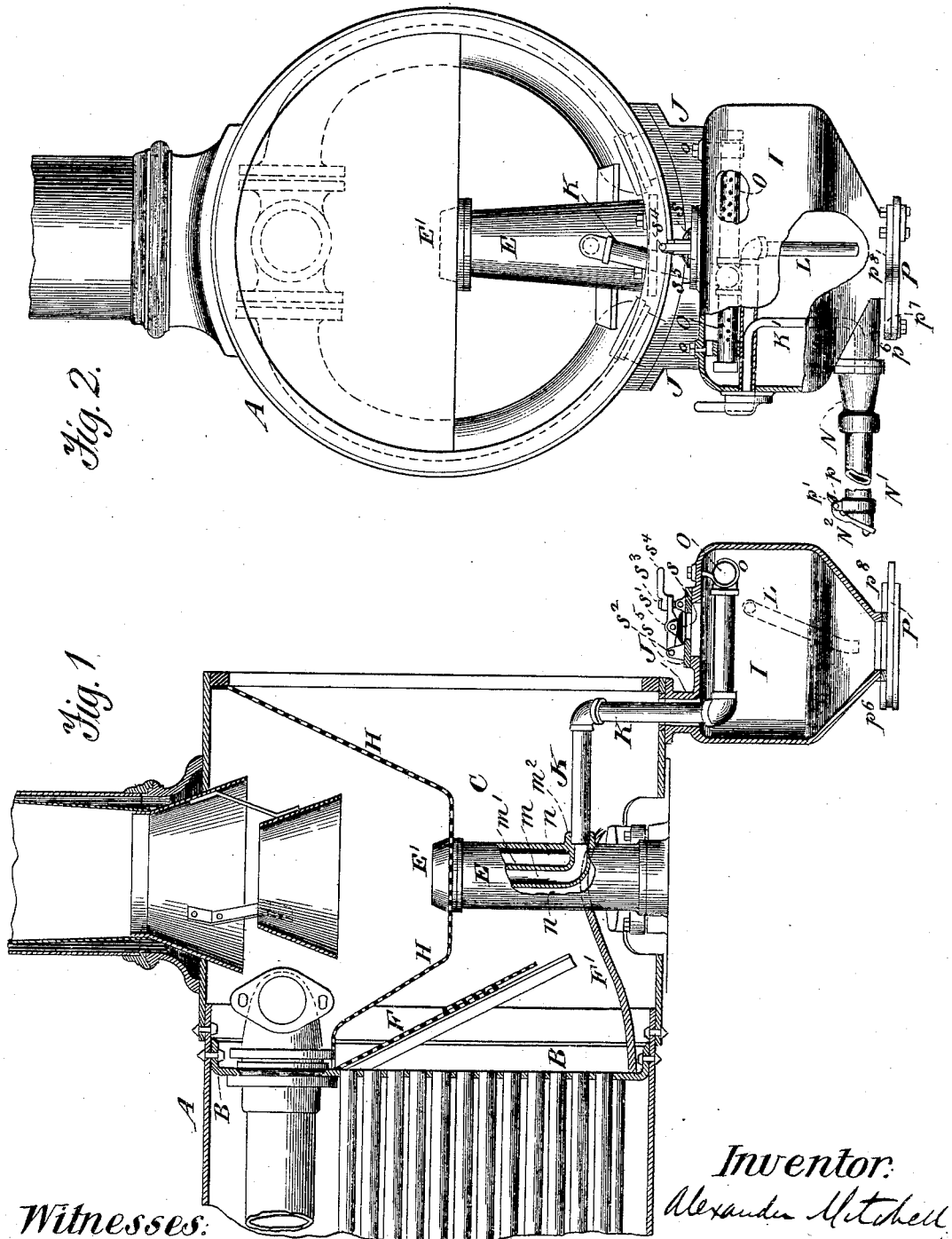
Witnesses:
A. Ruppert,
E. Hickenlooper.
Inventor:
Alexander Mitchell
by G. H. W. T. Howard
atty.

(No Model.) 6 Sheets—Sheet 2.
A. MITCHELL.
SPARK ARRESTER FOR LOCOMOTIVES.
No. 354,339. Patented Dec. 14, 1886.
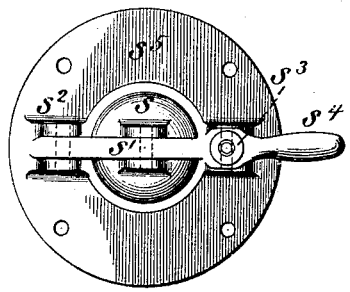
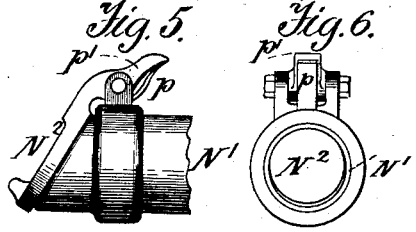
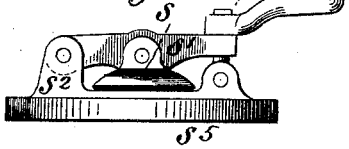
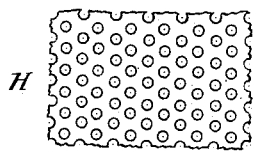
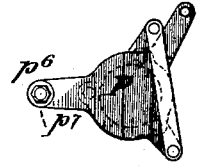
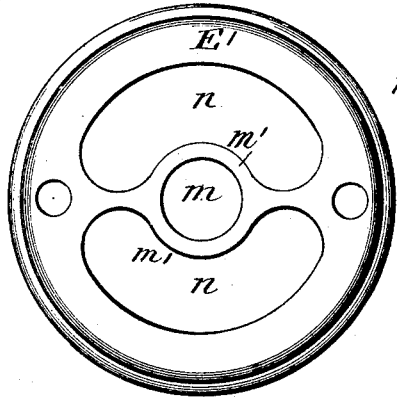
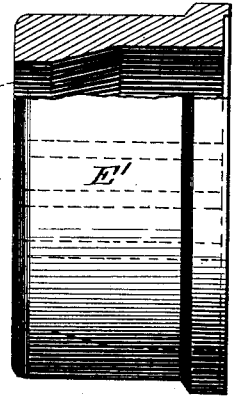
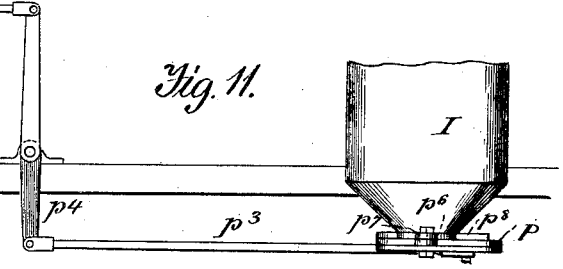
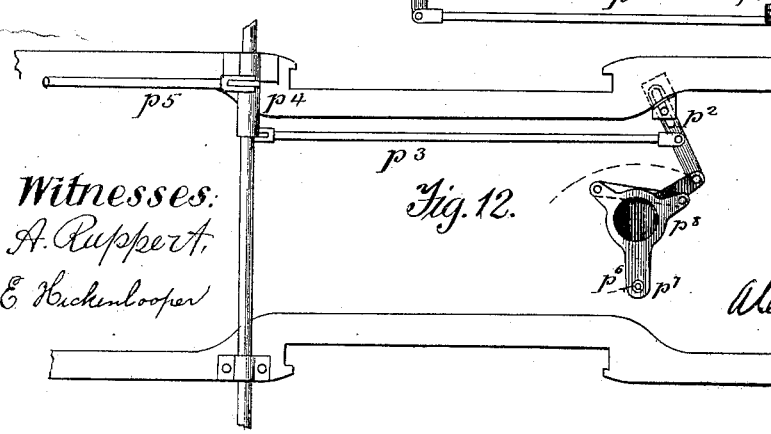
Witnesses:
A. Ruppert
E. Hickenlooper
Inventor:
Alexander Mitchell (No Model.) 6 Sheets—Sheet 3.
A. MITCHELL.
SPARK ARRESTER FOR LOCOMOTIVES.
No. 354,339. Patented Dec. 14, 1886.
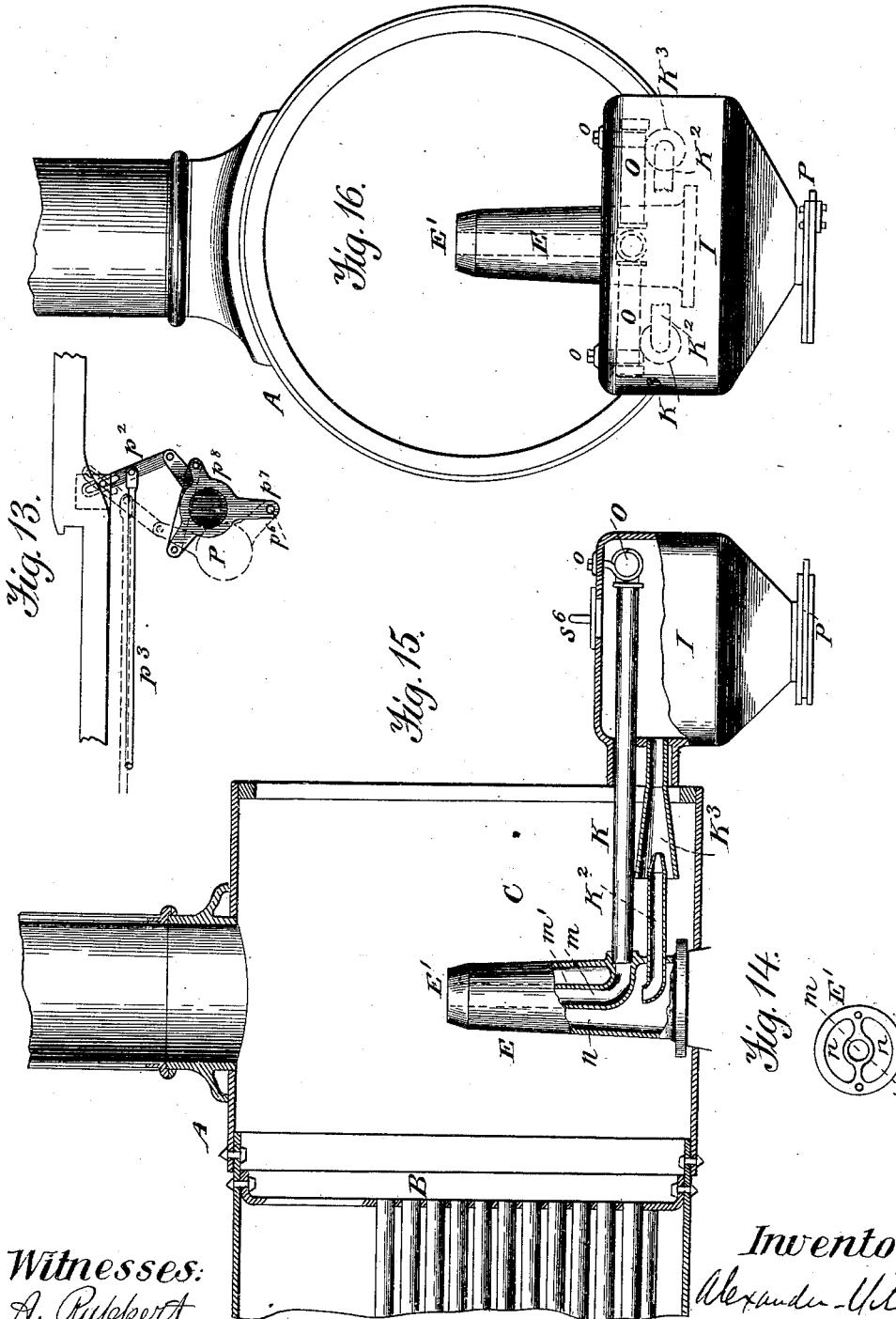
Witnesses:
A. Ruppert.
E. Hickenlooper
Inventor:
Alexander Mitchell
by G.H.W.T. Howard
attys (No Model.) 6 Sheets—Sheet 4.
A. MITCHELL.
SPARK ARRESTER FOR LOCOMOTIVES.
No. 354,339. Patented Dec. 14, 1886.
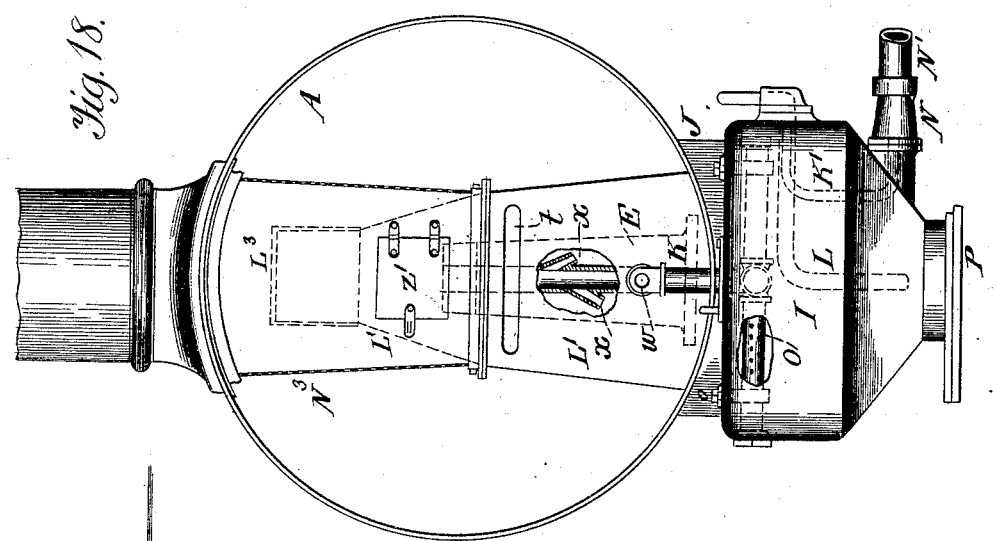
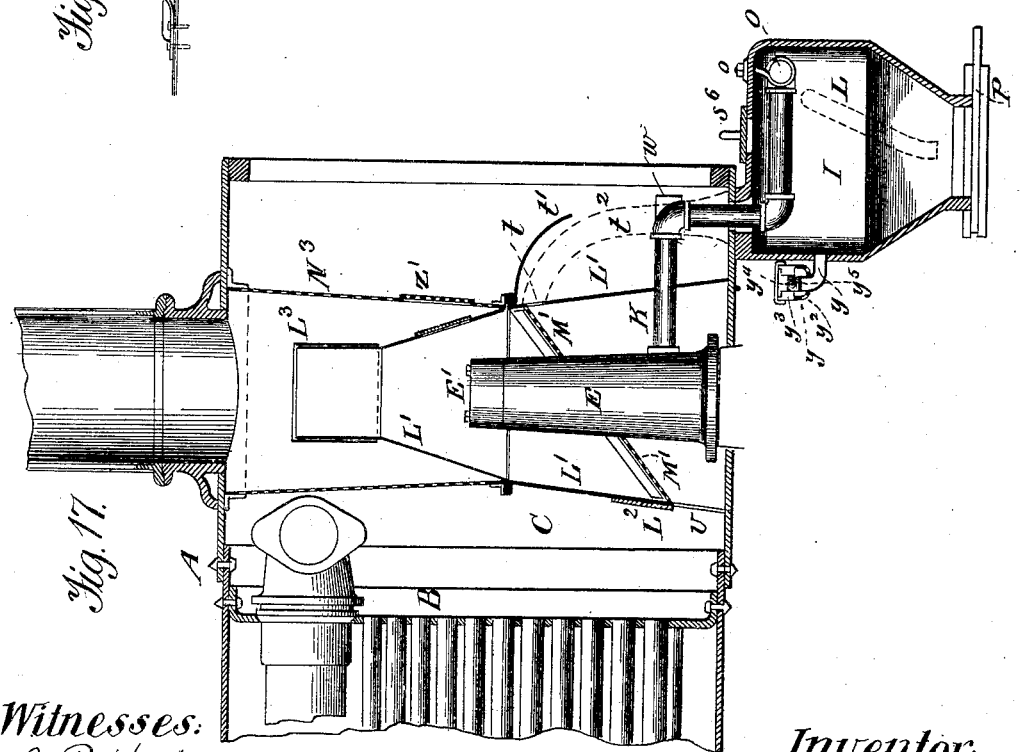
Witnesses:
A. Ruppert.
E. Hickenlooper
Inventor:
Alexander Mitchell,
by Geo. W. J. Howard,
attys.

(No Model.) 6 Sheets—Sheet 5.

A. MITCHELL.
SPARK ARRESTER FOR LOCOMOTIVES.

No. 354,339. Patented Dec. 14, 1886.

Witnesses:
A. Ruppert,
E. Hickenlooper

Inventor:
Alexander Mitchell,
by [signature], Attys.

(No Model.) 6 Sheets—Sheet 6.

A. MITCHELL.
SPARK ARRESTER FOR LOCOMOTIVES.

No. 354,339. Patented Dec. 14, 1886.

Witnesses:
A. Ruppert,
E. Hackenlooper

Inventor:
Alexander Mitchell,
by [signature]
attys.

UNITED STATES PATENT OFFICE.

ALEXANDER MITCHELL, OF WILKES-BARRÉ, PENNSYLVANIA.

SPARK-ARRESTER FOR LOCOMOTIVES.

SPECIFICATION forming part of Letters Patent No. 354,339, dated December 14, 1886.

Application filed August 5, 1886. Serial No. 210,081. (No model.)

*To all whom it may concern:*

Be it known that I, ALEXANDER MITCHELL, of Wilkes-Barré, in the county of Luzerne and State of Pennsylvania, have invented certain new and useful Improvements in Spark-Arresters for Locomotives, of which the following is a specification, reference being had to the accompanying drawings, and to the letters of reference marked thereon.

My invention is designed more particularly as an improvement upon Letters Patent No. 280,064, granted to me June 26, 1883, reference to which patent may be made for a fuller understanding of the improvements herein described and claimed.

The object of my invention is to construct a spark-arrester for a locomotive or any other engine where the steam is exhausted into the stack, whereby the disposal of the sparks may be effected without obstructing the draft.

In the accompanying drawings, Figure 1 is a longitudinal section of the front portion of a locomotive-boiler, (the front of the smoke-box being removed,) showing the application of my improvements thereto. Fig. 2 is a front elevation. Figs. 3, 4, 5, 6, 7, 8, 9, 10, 11, 12, 13, and 14 are details; and Figs. 15, 16, 17, 18, 19, 20, 21, 22, 23, 24, and 25, modifications, as hereinafter described.

Similar letters of reference indicate similar parts in the respective figures.

Referring more particularly to Figs. 1 to 14, inclusive, A is the locomotive-boiler, of which B is the tube-sheet, and C the smoke-box.

E is the exhaust-pipe, the upper end of which extends through the lower part of a perforated plate, H, which performs the function of the screen H in my said Patent No. 280,064.

Fig. 8 shows a section of the perforated screen, which, however, may be of wire-netting or other suitable material. The screen can be constructed in any desired form—as, for instance, in the form of a frustum of a cone, as in my Patents Nos. 160,456 and 280,064. A screen, F, also made of perforated sheet-iron, extends down at an angle from above the top line of the tubes, and may be made with a sliding section. The lower end of the screen F reaches down toward a curved plate, F', through which the exhaust-pipe E passes.

The exhaust-pipe itself is of peculiar construction, and will hereinafter be more particularly described.

I is a box or receptacle for sparks, connected to the lower end of the smoke-box C by a pipe or duct, J, extending the entire width of the box, as shown in Fig. 2. The receptacle I may be made in any suitable form, and must be of sufficient strength to withstand any internal or external pressure to which it may be subjected.

The construction of the exhaust-pipe E and nozzle E' is shown more particularly in Figs. 9, 10, and 14, Fig. 14 being a cross-section of the exhaust-pipe and Fig. 9 of the nozzle. Fig. 10 is an elevation of the nozzle. From Figs. 9 and 14 it will appear that a central duct, $m$, is formed within the pipe E and the nozzle E', said duct being surrounded by metal $m'$, which forms the inner walls of the two exhaust-channels $n$ $n$. The central duct, $m$, terminates in a boss, $m^2$, at the front side of the exhaust-pipe E, and to said boss is secured the pipe K, which passes through the pipe or duct J into the box or receptacle I, thus constituting the vacuum-pipe indicated by the corresponding letter in my said Patent No. 280,064. The end of the pipe K, which enters the box or receptacle I, connects with a transverse perforated pipe, O, which is suspended, near the upper part of the receptacle or box I, by bolts $o$. The ends of the pipe O are closed.

L is a pipe extending from the water-space of the boiler or other source of water-supply to the lower part of the box or receptacle I, and K' is a live-steam pipe, also entering the said box or receptacle. The steam-pipe K' enters the discharge-pipe N at the side of the receptacle, to which discharge is connected a pipe, N', having a spring-seated valve, $N^2$, the spring $p$ operating against the arm $p'$ of the valve, thus keeping it normally closed. The valve $N^2$ is shown enlarged in Figs. 5 and 6.

Figs. 7, 11, 12, and 13 show views of a sliding eccentric valve at the bottom of the box or receptacle I, said eccentric valve P sliding in a horizontal plane through the medium of the slotted link $p^2$, rod $p^3$, lever $p^4$, and rod $p^5$, which leads back to the cab. (See Figs. 11 and 12.) The valve P is pivoted at $p^6$ (see Fig. 13) to an ear, $p^7$, of a plate, $p^8$, rigidly secured to the lower part of the spark-receptacle I. Fig. 13 shows the valve P in its two positions—opened and closed—the dotted line showing it opened.

The top of the receptacle I (see Figs. 1 and 2) is closed by a valve, $s$, mounted upon a lever, $s'$, hinged to a lug, $s^2$, the free end of said lever being depressed, and the valve consequently closed, by means of a screw-bolt, $s^3$, and handle $s^4$, said handle forming the nut of the screw. The valve and its adjuncts are mounted upon a plate, $s^5$, which is suitably secured to the top of the box or receptacle I.

Figs. 15 and 16 show a modification in which a live-steam jet, $K^2$, enters the pipe $K^3$, leading from the upper part of the box or receptacle I, said modification contemplating, therefore, the use of both exhaust and live steam for the production of the vacuum.

Figure 23:
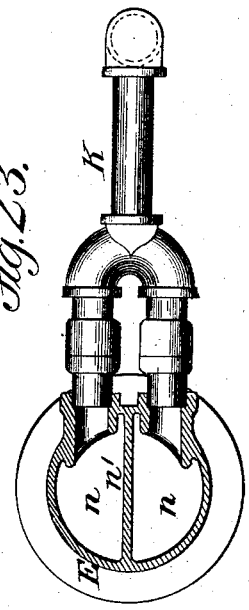
Figure 22:
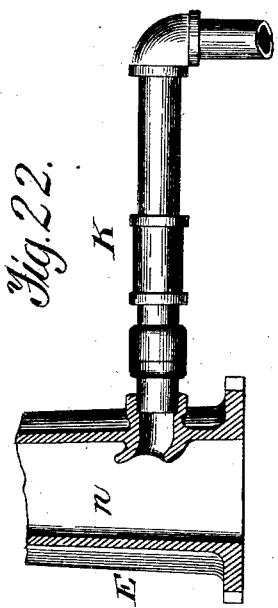
Figure 24:
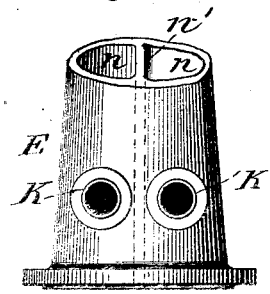

Figs. 17 and 18 show further modifications. L' is a lifting-pipe, made large at the bottom and of reduced diameter at the top. This pipe surrounds the exhaust-pipe E, and has a sliding plate, $L^2$, on the lower part, and a sliding sleeve, $L^3$, at the top, the plate $L^2$ and sleeve $L^3$ being intended to regulate the draft. The lifting-pipe L' is also furnished with an interior angular screen, M', closely fitted around and secured to the exhaust-pipe E. The screen M', though shown on an angle, may be horizontal, or made in the form of a frustum of a cone, as in my Patent No. 178,181, dated March 30, 1876. Surrounding the upper part of the lifting-pipe L' is a screen, $N^3$, of perforated plate or netting, the lower end being secured to the lifting-pipe and the upper end to the smoke-box or to the base of the stack, which can be enlarged to give the desired amount of screen-surface. In the lifting-pipe, under the upper end of the screen M', a slot or opening, $t$, is cut, and above the slot is shown a curved deflecting-plate, $t'$. A pipe the size of the slot may be used to connect the lifting-pipe with the opening leading into the spark-box. (See dotted lines $t^2$ in Fig. 17.) By the arrangement shown in Figs. 17 and 18 ample screen-area is provided. The action of the exhaust-steam draws the sparks through the opening $v$ (the sliding plate $L^2$ being raised) into the lower part of the lifting-pipe next to the tubes. The sparks are drawn up the under side of the angular screen M' to the slot $t$ in the lifting-pipe L', whence they escape, and are deflected by the plate $t'$, or carried by the connecting-pipe $t^2$, into the spark-receptacle I, assisted or drawn into the box by the partial vacuum produced by the exhaust-steam, as hereinbefore described. A vacuum may also be produced by connecting a live-steam pipe to the pipe leading to the central duct, $m$, of the exhaust-pipe I, as at $w$; or by admitting exhaust-steam into said central duct, $m$, from the exhaust-passages $n\ n$, as at $x$; or by inserting the end or ends of the perforated pipes O into the exhaust-passages $n\ n$, as shown in Figs. 22, 23, and 24.

In Fig. 17 is shown attached to the side of the spark-receptacle I an overflow-pipe, $y$, having an outer casing, $y'$, holes $y^2$, and wings $y^3$. Within the casing, and seated upon the top of the tube $y$, is a wooden float or piston-valve, $y^4$, the lower face of which is furnished with an asbestus ring, $y^5$. Water flowing from the spark-receptacle I will raise the valve and flow out from the holes $y^2$, the valve $y^4$ being guided by the wings $y^3$. The water runs off freely without danger of freezing in the winter. The overflow-valve is of course only used when water is employed within the spark-box.

Instead of the valve $s$ and its adjuncts, as shown in Figs. 1, 2, 3, and 4, I employ, as shown in Fig. 17, a sliding valve, $s^6$, which is held down to the top of the spark-receptacle I by means of a spring, $s^7$. (Shown in Fig. 19.) The valve $s^6$ is attached to the top of the receptacle in any suitable way allowing it to slide, the downward force of the spring $s^7$ causing the friction necessary to hold the valve in place.

Figure 20:
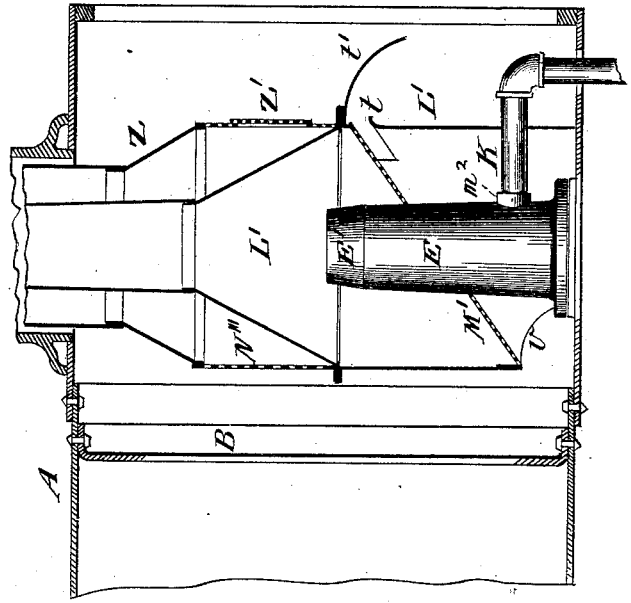

Referring to Figs. 20 and 21, the lower part of the stack is enlarged or made cone-shaped, as shown at $z$, to fit the screen $N^3$. The perforated screen $N^3$ is provided with a door, $z'$, also shown in Figs. 17 and 18.

By the use of the lifting-pipe, in connection with the spark-receptacle, a better draft is produced, and a finer netting may be used. The smoke-box and lower tubes may be kept cleaner, and fewer sparks are thrown.

It will be understood that the sparks, when drawn into the spark-receptacle I, may be extinguished by water or not, as desired, and withdrawn through the discharge N, the steam-pipe K', which enters the discharge, facilitating the expulsion of the accumulated material.

Figs. 22, 23, and 24 show a modified arrangement of exhaust and vacuum pipes. The vacuum-pipe K is provided with two branches, each one entering one side of the exhaust-pipe, which is provided with the partition $n'$.

Figure 25:
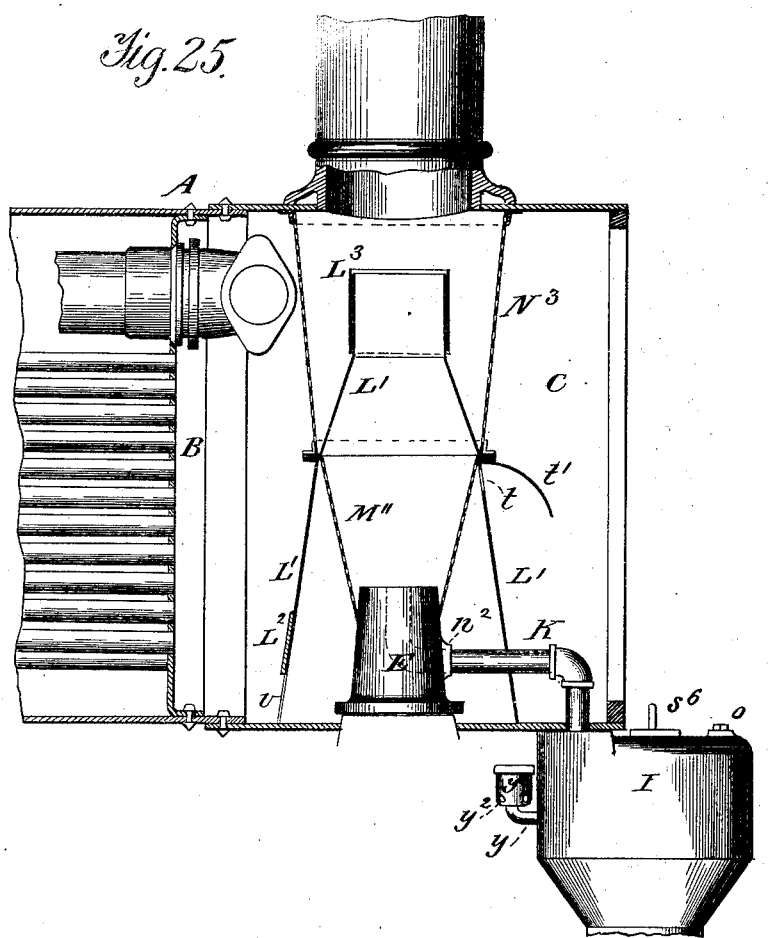

Fig. 25 shows a further modification, in which a low exhaust is used in connection with a lifting-pipe, L', screen $N^3$, and inner conical screen, $M^2$.

Having described my invention, I claim—

1. In a spark-arresting device, the smoke-box and spark-receptacle communicating therewith, combined with a centrally-apertured exhaust-pipe and a vacuum-pipe connecting said central aperture with the spark-receptacle, substantially as set forth.

2. In a spark-arresting device, an exhaust-pipe having an aperture formed within it separate from the exhaust-passages, combined with a vacuum-pipe and spark-receptacle, said vacuum-pipe connecting the spark-receptacle with the said aperture within the exhaust-pipe, substantially as set forth.

3. In a spark-arresting device, the smoke-box C, spark-receptacle I, communicating therewith, exhaust-pipe E, having the duct $m$ and exhaust-channels $n$, and perforated plate or screen H, combined with vacuum-pipe K, connecting the duct $m$ of the exhaust-pipe with the interior of the spark-receptacle, substantially as set forth.

4. In a spark-arresting device, the smoke-box C, spark-receptacle I, communicating therewith, inclined screen F, curved plate F', and screen H, combined with the exhaust-pipe and a vacuum-pipe leading from an aperture of the exhaust-pipe (separated from the exhaust-channels) to the interior of the spark-receptacle, substantially as set forth.

5. In a spark-arresting device, the combination, with a boiler having flues and a smoke-box, all of ordinary construction, of a spark-receptacle communicating with the smoke-box, a screen, F, curved plate F', perforated plate or screen H, and means, substantially as described, for producing a vacuum in the spark-receptacle, substantially as set forth.

6. In a spark-arresting device, the combination, with the smoke-box and suitable spark deflecting and screening devices within said smoke-box and a spark-receptacle communicating with said smoke-box, of an exhaust-pipe having the passages $n$ and aperture $m$, separated from said passages, and a pipe connecting said aperture $m$ with the interior of the spark-receptacle, substantially as set forth.

7. In a spark-arresting device, the receptacle I, combined with the discharge N N' and spring-valve $N^2$, substantially as set forth.

8. In a spark-arresting device, the spark-receptacle L, combined with the discharge N N', valve $N^2$, and live-steam pipe K, substantially as set forth.

9. In a spark-arresting device, the receptacle I, combined with the plate $p^8$ and valve P, pivoted to said plate at $p^6$, and adapted to open and close in a horizontal plane, substantially as set forth.

10. The combination, in a spark-arresting device, of the screen H, exhaust-nozzle E', and exhaust-pipe E, said exhaust-nozzle and pipe having the exhaust-passages $n$ and aperture $m$, substantially as set forth.

11. In a spark-arresting device, the combination of the smoke-box, spark-receptacle communicating therewith, pipe $K^3$, and live-steam jet $K^2$, substantially as set forth.

12. In a spark-arresting device, the smoke-box C and stack, spark-receptacle I, communicating with the smoke-box, exhaust-pipe E, lifting-pipe L', and screens M' and $N^3$, combined with a vacuum-pipe leading from the exhaust to the interior of the spark-receptacle, substantially as set forth.

13. In a spark-arresting device, the smoke-box C and stack, spark-receptacle I, communicating with the smoke-box, exhaust-pipe E, lifting-pipe L', sliding sleeve $L^3$, and screens M' and $N^3$, combined with a vacuum-pipe leading from the exhaust to the interior of the spark-receptacle, substantially as set forth.

14. In a spark-arresting device, a smoke-box, a spark-receptacle communicating therewith, and a slotted or perforated lifting-pipe having within it and surrounding the exhaust-pipe E the perforated screen M', combined with the deflecting-plate $t'$ and means for connecting the exhaust with the spark-receptacle, whereby a vacuum therein is produced and sparks drawn and deflected into said receptacle, substantially as set forth.

15. In a spark-arresting device, a smoke-box, a spark-receptacle communicating therewith and a slotted or perforated lifting-pipe having within it and surrounding the exhaust-pipe E the perforated screen M', combined with a pipe, $t^2$, connecting the exhaust with the spark-receptacle, whereby a vacuum therein is produced and sparks are drawn and deflected into said receptacle, substantially as set forth.

16. In a spark-arresting device, the smoke-box C, exhaust E, lifting-pipe L', having the openings $v$ and $t$, and screen M', combined with the spark-receptacle I, communicating with the smoke-box, and means for connecting the interior of the receptacle with the exhaust for the production of a vacuum within the receptacle, and also means for deflecting or carrying sparks from the lifting-pipe to said receptacle, substantially as set forth.

17. In a spark-arresting device, the spark-receptacle I, having the overflow-pipe $y$, casing $y'$, provided with holes $y^2$, and wings $y^3$, combined with the float-valve $y^4$, substantially as set forth.

18. In a spark-arresting device, the combination of a low exhaust, a lifting-pipe, L', screens $N^3$ and M', and means for withdrawing the sparks from the lifting-pipe to the spark-receptacle by the production of a vacuum therein, substantially as set forth.

19. In a spark-arresting device, the exhaust E, having the aperture $m$, exhaust-passages $n$, and connecting-apertures $x$, substantially as set forth.

20. In a spark-arresting device, the exhaust-pipe E, having the aperture $m$, combined with the vacuum-pipe K and a live-steam connection, $w$, leading to said vacuum-pipe, substantially as set forth.

21. In a spark-arresting device, the spark-receptacle I, vacuum-pipe K, and perforated transverse pipe O, suspended within said receptacle by bolts $o$, substantially as set forth.

22. In a spark-arresting device, the lifting-pipe L', exhaust E, screens M' and $N^3$, and a stack having the enlarged connection $z$, substantially as set forth.

23. In a spark-arresting device, the exhaust E, having the passages $n$ and partition $n'$, combined with the branched vacuum-pipe K, one branch leading to each passage $n$, substantially as set forth.

In testimony whereof I hereunto set my hand and seal.

ALEXANDER MITCHELL. [L. S.]

Witnesses:
 JOHN MCGAHREN,
 GEO. A. WELLS.